United States Patent [19]

von Pragenau

[11] Patent Number: 4,621,492

[45] Date of Patent: Nov. 11, 1986

[54] LOW LOSS INJECTOR FOR LIQUID PROPELLANT ROCKET ENGINES

[75] Inventor: George L. von Pragenau, Huntsville, Ala.

[73] Assignee: The United States of America as represented by the Administrator of the National Aeronautics and Space Administration, Washington, D.C.

[21] Appl. No.: 690,273

[22] Filed: Jan. 10, 1985

[51] Int. Cl.[4] .............................................. F02K 9/00
[52] U.S. Cl. ...................................... 60/258; 60/746; 239/132.5; 239/425; 239/403
[58] Field of Search ............... 60/258, 739, 742, 746, 60/732, 733; 239/132.5, 132, 424.5, 425, 419.3, 427.5, 403

[56] References Cited

U.S. PATENT DOCUMENTS

| | | | |
|---|---|---|---|
| 1,875,457 | 9/1932 | Hemmingsen | 239/132.5 |
| 2,325,495 | 7/1943 | Ferguson | 239/403 |
| 2,667,740 | 2/1954 | Goddard | 60/258 |
| 2,810,259 | 10/1957 | Burdett, Jr. | 60/258 |
| 3,270,499 | 9/1966 | Escher | 60/258 |
| 3,581,495 | 6/1971 | Kah | 60/258 |
| 3,611,722 | 10/1971 | Shick | 60/258 |
| 3,615,054 | 10/1971 | Botz | 60/258 |
| 3,662,547 | 5/1972 | Paine et al. | 60/258 |
| 3,897,007 | 7/1975 | Roy | 239/403 |

FOREIGN PATENT DOCUMENTS 853495 11/1960 United Kingdom .................. 60/258

Primary Examiner—Louis J. Casaregola
Assistant Examiner—Donald E. Stout
Attorney, Agent, or Firm—Joseph H. Beumer; John R. Manning; Leon D. Wofford, Jr.

[57] ABSTRACT

A low pressure loss injector element A is disclosed for the main combustion chamber of a rocket engine which includes a lox post (40) terminating in a cylindrical barrel (50). Received within the barrel (50) is a lox plug (46) which is threaded in the lox post and includes an interchangeable lox metering sieve (60) which meters the lox into an annular lox passage (56). A second annular gas passage (62) is coaxial with the annular lox passage (56). A cylindrical sleeve (64) surrounds the annular gas passage (62) and includes an interchangeable gas metering sieve (77) having metering orifices through which a hot gas passes into the annular passage (62). The jets which emerge from the annular lox passage and annular gas passage intersect at 80 which is recessed away from the combustion area. Thus, mixing and combustion stability are enhanced.

23 Claims, 5 Drawing Figures

LOW LOSS INJECTOR FOR LIQUID PROPELLANT ROCKET ENGINES

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates to a fuel injector for use in a liquid rocket engine, and more particularly to an injector element which has been designed to provide a low pressure drop through the injector for increased thrust and combustion efficiencies.

In the past coaxial type injector elements have been used in the main injector assembly of liquid propellant rocket engines for space vehicles such as the space shuttle vehicle. The prior injector assembly and injector elements have utilized baffles and helmholz resonators to dampen oscillations and provide for more stable and efficient combustion.

In addition, the metering orifice for the liquid oxygen in the prior main injector elements has been at the inlet end of the injector element making it difficult to replace or change the size of the metering orifice to vary the mixture ratio. The injector elements themselves are welded in tightly and are very difficult, if not impossible, to replace without a major overhaul of the engine.

In the prior main injector assembly of the engine for the space shuttle vehicle, two types of main injector elements have been required due to the use of baffle elements. The baffle elements are used on a number of the injector elements and extend into the combustion chamber. While the baffle elements have been employed to provide stability of combustion, they also affect the combustion efficiency in an adverse way. Thus, not only has the prior design required two different types of injector elements, but their use has had both a positive and adverse effect.

Additionally, the lateral inflow of the hot gases from the turbine exhaust has caused overloading of the post of the injector element which can result in fractures of the injector elements. When the post of the injector element fractures, the liquid oxygen escapes causing lox (liquid oxygen) fires.

Various other elements having coaxial passages have been known prior to the present invention. For example, U.S. Pat. No. 4,036,434 discloses a nozzle for delivering a low velocity primary fuel having three major passages. It is a coaxial arrangement with a center passage providing a core stream and a coaxial passage which provides the fuel. A second coaxial passage is provided which delivers a purging fluid through a porous membrane at the primary face plate of the combusion chamber. The principal arrangement is different from the instant invention and generally unrelated to rocket engine fuel injectors.

U.S. Pat. No. 3,740,946 relates to a throttling injector for a liquid rocket engine which provides a desired pressure drop. The throttling valve varies the propellant flow to produce a momentum change. This is a different operating function and the throttling arrangement would not be suitable in a rocket engine environment.

U.S. Pat. No. 3,615,054 discloses a wafer construction which produces a misted type of injection. A fuel mist and an oxidizer mix a short distance from the combustion chamber face and achieve a low velocity mixing. This basic arrangement is quite different from coaxial injection and high velocity mixing of the instant invention.

The above patents do not disclose annular type injection which characterizes the injection element of the present invention wherein two concentric annuli adjacent to each other are applied for better mixing.

Accordingly, an important object of the present invention is to provide a main injector element for the main injector assembly of a liquid rocket engine having low pressure losses through the element for increased thrust.

Another important object of the present invention is to provide a main injector element for a liquid rocket engine which provides a more stable combustion pattern at the face plate of the main injector assembly.

Another important object of the present invention is to provide a larger diameter injector element with a communicating and resistive diametrical face path for good stability to avoid the use of baffle elements and thus increase combustion specific impulse.

Another important object of the present invention is to provide a main injector element for a main injector assembly which has a lox post having a larger diameter and wall thickness for reduced stresses caused by the lateral inflow of hot gases to avoid post fractures.

Still another important object of the present invention is to provide a main injector element for the main assembly of a liquid rocket engine which has metering orifices which can be easily replaced and exchanged to vary the mixture ratio.

Still another important object of the present invention is to provide a fuel injection element which has annular coaxial fuel passages dimensioned to produce a low pressure drop through the annulus for providing increased thrust.

Still another important object of the present invention is to provide larger diameter elements of larger clearances less sensitive to tolerances and less sensitive to clogging by contamination and soot.

Still another important object of the present invention is to provide a main injector assembly having a plurality of main injector elements which are easily maintainable and have a long life, and in which parts of the element may be replaced to increase the enhanced life of the injector element without excessive labor or engine outage.

SUMMARY OF THE INVENTION

The above objectives are accomplished according to the present invention by providing an injector element for the main injector assembly of a liquid rocket engine having larger diameter passages for the flow of lox (liquid oxygen) and hot gases through the element. The larger passages of the element are also accompanied by a larger diameter in the area of the lox post of the element so that the injector elements are increased in their structural strength where the hot gases flow laterally against the posts in the hot gas manifold. By recessing the annuli through which the gases flow from the primary face plate, stability of combustion is provided. Furthermore, the design of the main injector elements has eliminated the baffles which were utilized in the prior injector assemblies. Elimination is facilitated by the increased stability accoording to the present invention due to the recessed annuli and the larger diameter passages. A roughened surface is provided at the outlet end of the element passage for the lox and the hot gas which causes a degree of turbulence that also enhances the combustibility of the gases when they are mixed together prior to combustion. The metering orifices for the hot gas and the lox flow are provided by removable sleeves. In the case of a damaged injector outlet, or where it is desired to change the sizes of the metering orifices, the sleeves may be easily replaced without any extensive labor requirements or down time.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF A PREFERRED EMBODIMENT

The invention relates to an efficient rocket propellant injector element to raise the main engine thrust and payload of a space shuttle vehicle. Relatively large diameter injector elements with low pressure loss are disclosed for the main combustion chamber and the preburners. The low pressure losses facilitate more propellant flow which raises thrust. Payload is gained by specific impulse and also by thrust increase. The combustion chamber pressure is stabilized by selecting the proper cavity size in the injector annuli while reducing the injection pressure loss which normally is kept high for stability. The rather large annular recesses and passages in the injector elements provide acoustic damping which make baffles and acoustic absorbers heretofore utilized in the vehicle engines unnecessary. The results of the instant invention have shown a tenfold reduction in flow-induced stresses compared to the present design. Reduced tolerances, fewer elements, better maintenance, and more convenient variance of fuel-oxidizer mixture ratio are provided.

Figure 1:
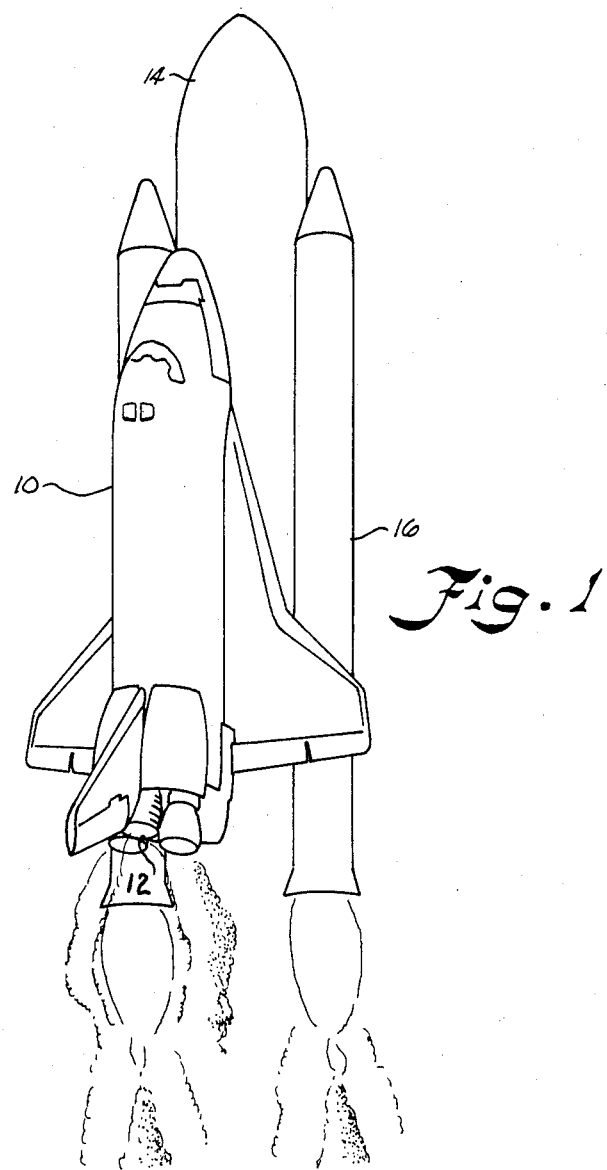
FIG. 1 is a perspective view illustrating a space shuttle orbiter propelled by three main rocket engines having low loss injector elements according to the invention.

Referring now in more detail to the drawings, a space shuttle orbiter 10 is illustrated in FIG. 1 having three main engines 12, each including a combustion chamber and an injector assembly. The shuttle orbiter 10 is illustrated in piggyback form mounted to an external tank 14 and solid rocket boosters 16.

Figures 3, 5:
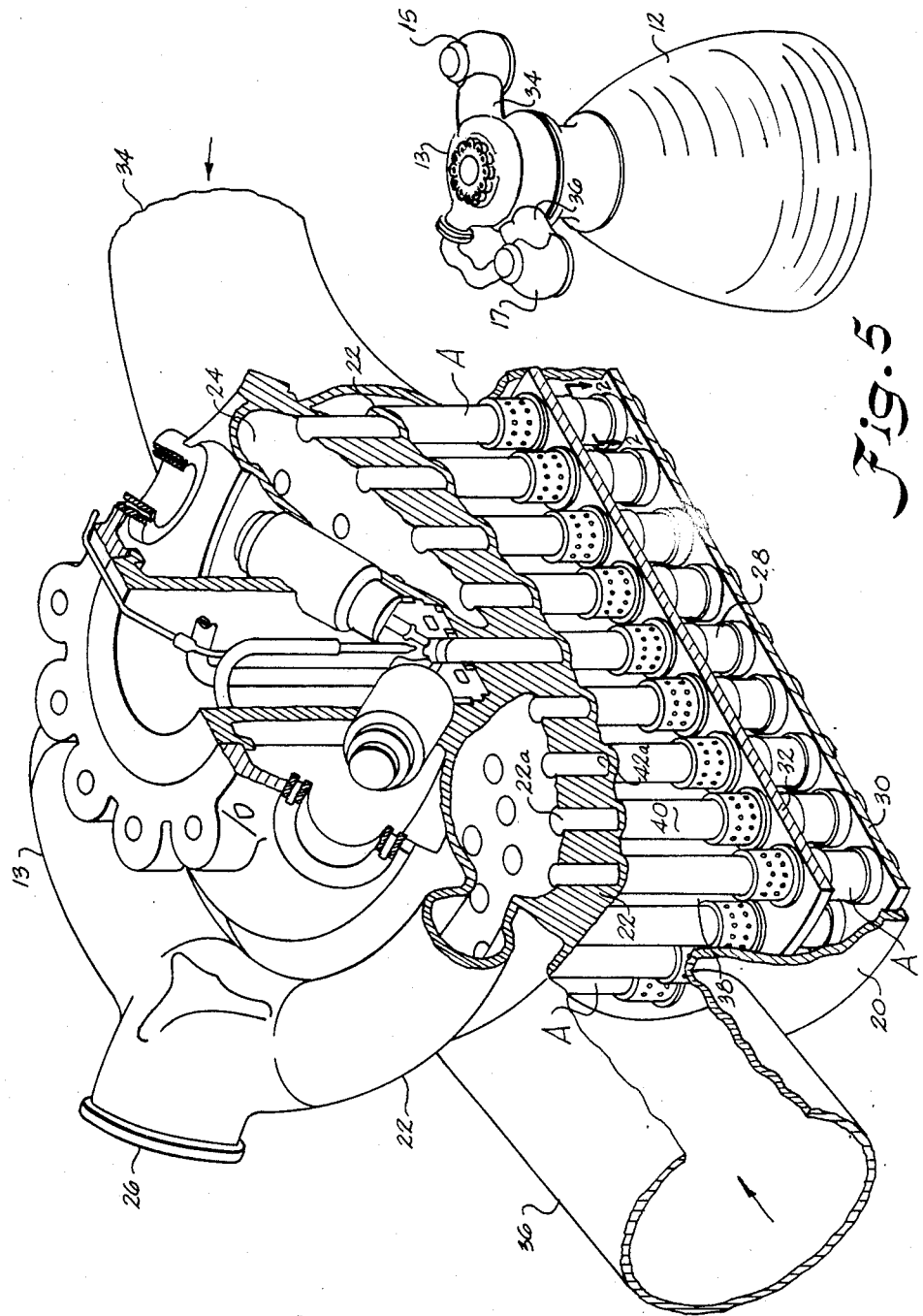
FIG. 3 is a cut-away perspective view of a main rocket injector assembly and low loss injector elements constructed according to the invention.
FIG. 5 is a perspective view of a main rocket engine and preburner assembly.

As shown in FIG. 5, each engine 12 includes a main combustion chamber 13, a fuel preburner 15 and an oxidizer preburner 17 communicating with chamber 13 by means of ducts 34 and 36.

In FIG. 3, the main combustion injector assembly 20 is illustrated in more detail. Basically, the main combustion chamber 13 includes a lower injector assembly 20 which includes a plurality of injector elements A constructed in accordance with the present invention. A lox dome 22 is carried above the injector assembly 20 and injector elements A and includes a lox distribution manifold 24 by which lox is delivered to the individual elements. Lox enters the manifold through an inlet 26. An igniter 28 is provided for igniting the fuel-oxidizer mixture. Since the main combustion chamber 13 and main injector assembly 20 are conventional except for the injector elements A which are incorporated into the injector assembly as constructed in accordance with the present invention, only so much of the main combustion chamber and main injector assembly as are necessary to an understanding of the invention will be disclosed hereinafter. Accordingly, the main injector assembly includes a primary face plate 30 and a secondary face plate 32. A hydrogen manifold is provided in the space between the primary and secondary face plates. The primary face plate 30 is normally porous for the admittance of hydrogen to the combustion chamber which is on the exterior side of the primary face plate. Lateral transfer ducts 34 and 36 are provided on generally opposing sides of the main injector assembly 20. The transfer ducts deliver flows of hot gases coming from the exhaust of turbines driven by the fuel and oxidizer preburners 15 and 17. The hot gases from the turbine discharge enter the lateral transfer ducts in the direction of the arrows shown in FIG. 3. The hot gases enter the hot gas manifold 38 which is formed between the secondary face plate 32 and the lox dome 22. The purposes of the hot gas will be described more fully hereinafter.

Figure 2:
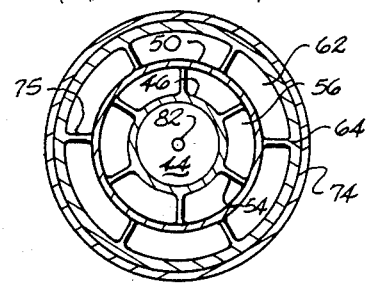
FIG. 2 is a section taken through an injector element constructed according to the invention along line 2—2 of FIG. 3.
Figure 4:
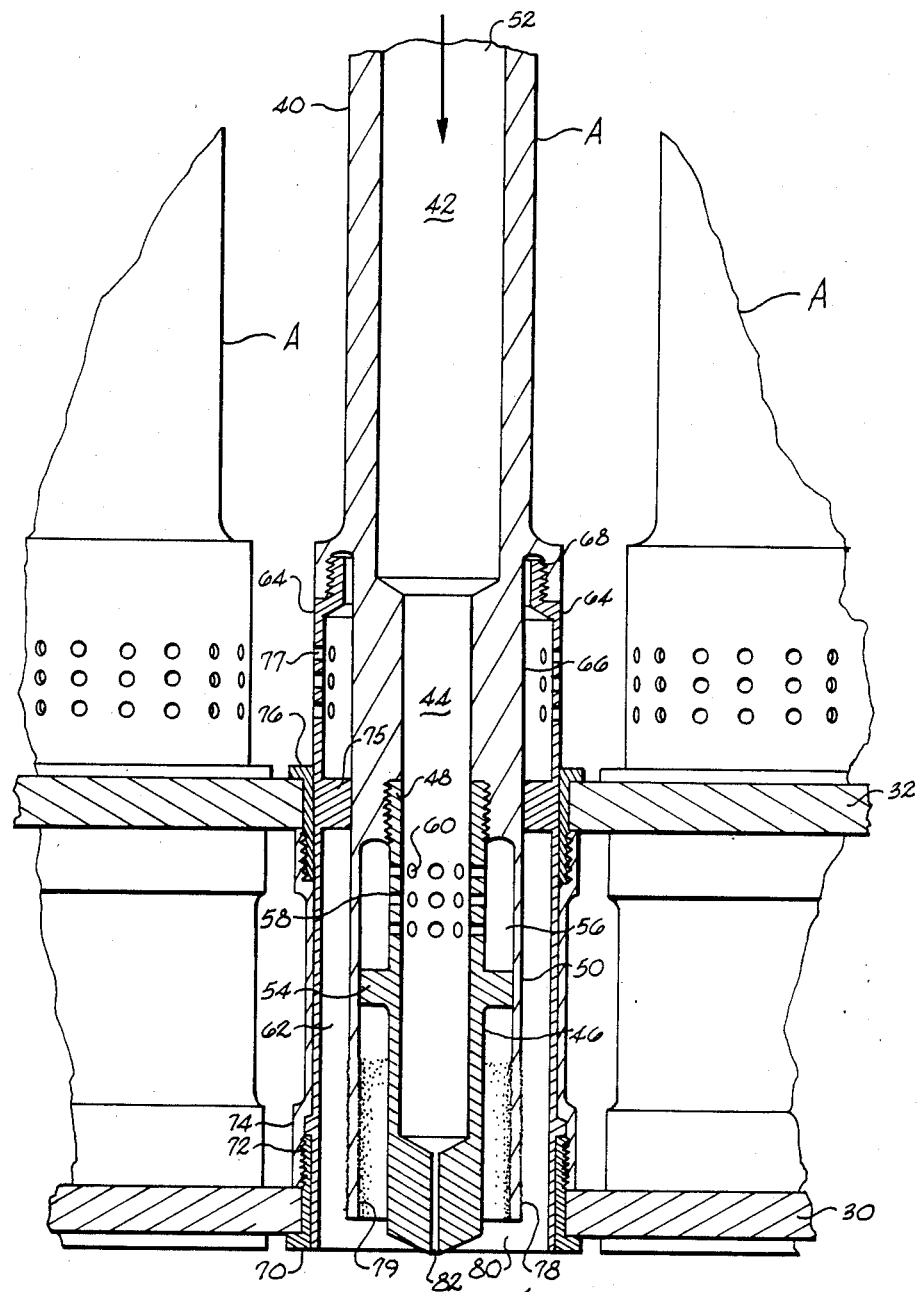
FIG. 4 is an elevation taken in section illustrating a low-loss injector element constructed according to the instant invention.

Referring now to FIGS. 2 and 4, the injector element A constructed according to the present invention will now be described in more detail. As illustrated, the element A includes an elongated lox post 40. One end of the lox post 40 is intergrally welded to the lox dome 22 and aligned therewith so that passages 22a formed in the lox dome communicate the flow of lox into a first central passage 42 formed in the lox post 40. The flow of lox into the lox post passage is unrestricted through opening 42a of same diameter. In contrast, the main injector element used prior to the present invention employed a metering orifice for the lox in the inlet to the lox post passage. The details of the prior main injector element may be had by reference to NASA Technical Memorandum NASA TM 82567 more fully identified hereinafter. In the present invention, the diameter of the lox post in a preferred embodiment of the invention is approximately 1.25 inches whereas in the prior main injector element the diameter was 0.329 inches. Instead of a 0.63 inch spacing between the prior injector elements of the main injector assembly, there is a 2 inch spacing in the present invention. The number of elements required is considerably reduced.

The increased diameter of the lox post resists the high bending stresses induced by the blast of hot gases entering through the lateral transfer ducts. The outer row of injector elements face the transfer ducts directly. Heretofore, in the prior elements design, the blast of hot gases into the injector elements has caused a high incidence of fatigue. Numerous measures have been provided to reduce this effect which required vortex spoilers and other costly measures.

Referring once again to FIG. 4, the first central lox passage 42 reduces to a second central lox passage 44.

Carried on the end of the lox post 40 is a lox plug 46. The lox plug 46 is a cylindrical plug which is threaded at 48 into interior threads provided in the lox post which provides a releaseable mounting means by which the lox plug may be removed and exchanged. A cylindrical barrel 50 is formed as an extension on the end of the lox post 40 remote from the lox inlet end 52. As can best be seen in FIG. 4, the lox plug 46 is received within this cylindrical barrel when threaded into the lox post at 48. Radially extending fins 54 are formed on the lox plug and bear against the inner diameter surface of the barrel 50. Fins 54 are spaced 60 degrees apart circumferentially around the lox plug. The fins 54 provide an engagement means by which a tool may be inserted and the plug turned for removal from the releaseable threaded connection. There is a first annular passage 56 which surrounds the lox plug and is coaxial with the central lox passage 44 inside the plug providing an annular lox passage. There is a lox metering means 58 which consists of a lox metering sieve in the form of a plurality of metering orifices 60 formed in the cylindrical sidewall of the plug 46. The metering orifices 60 determine the mixture ratio by metering the lox which flows from the central passage 44 through the cylindrical sidewall of the plug into the annular lox passage 56. For this reason, and for maintenance purposes, the lox plug 46 is made to be removable and replaceable. By replacing the lox plug with a lox plug having differently sized metering orifices, the mixture ratio may be conveniently changed.

A second annular passage 62 provides an annular gas passage for the flow of the hot gases coming from the lateral ducts 34 and 36 for combustion. The annular gas passage 62 is coaxial with the annular lox passage 56 and the central lox passage 44. The cylindrical barrel 50 provides a first boundary wall between the annular passages 56 and 62. A second boundary wall defining the outer boundary of the annular gas passage 62 is provided by a removable hot gas sleeve 64 which encircles a reduced cylindrical barrel extension 66 of the lox post. The sleeve 64 is threaded to the lox post at 68 and is locked to the primary face plate 30 by means of a ring nut 70 which is threaded into a spacer 74 at 72. The threaded connections at 68 and 72 provide releaseable attachment means for the sleeve 64. Inwardly extending engagement means are provided in the form of radial fins 75 integral with the sleeve 64 and bearing against the lox post barrel 66. Fins 75 are spaced 60 degrees around the sleeve for engagement by a tool so that the sleeve may be turned for removal.

Hot gas metering means is provided in the form of a gas sieve formed in the sleeve 64 which includes a plurality of gas metering orifices 77 by which the hot gases coming from the lateral transfer ducts enter laterally into the annular gas passage 62. The orifices 77 are slanted. The spacer shroud 74 spaces the primary and secondary face plates 30 and 32. There is an upper lock ring 76 which threads into the spacer shroud.

Referring once again to the barrel 50 of the lox post, it can be seen that the inner diameter surface 79 of the barrel is roughened in the final area of the annular lox passage. Likewise, the outer diameter surface 78 of the barrel is roughened in the final area of the annular gas passage 62. The roughened surfaces are turbulence-inducing means which induce turbulent layers between the emerging jets of the lox and the hot gas which emerge from the respective annular passages. Mixing is enhanced and contained by the impulse of the much swifter moving layers of both propellants.

The coaxial injection of the lox and gas produces a stable combustion effect. The intersection of the lox and the gas jets is well distributed and less sensitive to combustion pressure since the initiation of the impinging jets is recessed from the combustion. The velocity of the gas is considerably larger (20 times) than the lox jet for effective mixing.

The large element diameters in the area of the lox post provide larger corner radii to reduce stress concentrations from the blast of hot gases entering the injector assembly. Bending stresses due to the hot gases are reduced on the order of ten fold. The large diameter elements solve the stress problem, uncouple the vortex frequencies, and damp combustion chamber acoustic resonances, all of which provide for more stable combustion.

As an example of a preferred embodiment, the lox post 40 has an inner diameter of 0.80 inches and an outer diameter of 1.25 inches. The lox metering sieve of the lox plug 50 has 36 metering orifices with a 0.084 inch diameter. The gas metering sieve in the sleeve 64 has 48 slanted and well-rounded metering orifices of 0.20 inch diameter. The length of the lox post between the lox dome 22 at the periphery and the secondary face plate 32 is 5.935 inches.

A fuller report of the results provided by the low pressure loss injector nozzle constructed according to the present invention may be had by reference to the NASA Technical Memorandum, NASA TM 82567, entitled LOW LOSS INJECTOR FOR SPACE SHUTTLE MAIN ENGINE by George L. von Pragenau, February 1984, which disclosure is hereby incorporated herein by reference.

A coolant hole 82 is formed in the lox plug 46 which allows a portion of the lox to exit the far end of the lox plug as a coolant.

While a preferred embodiment of the invention has been described using specific terms, such description is for illustrative purposes only, and it is to be understood that changes and variations may be made without departing from the spirit or scope of the following claims.

What is claimed is:

1. A low pressure loss fuel injection element for use in the main combustion chamber of a rocket engine comprising:

an elongated lox post having a first central passage with a non-restricted inlet opening leading into said lox post passage;

a cylindrical barrel extending from said lox post on an end remote from said lox inlet opening;

a lox plug carried by said lox post having a second central passage in coincident axial alignment with said first central passage of said elongated lox post;

said barrel providing a first boundary wall surrounding said lox plug defining a first annular passage between said boundary wall and said plug;

lox metering means formed in said lox plug through which lox is delivered and metered from said central passage to said first annular passage;

second boundary wall means surrounding said first boundary wall means defining a second annular passage coaxial with said first annular passage and said second central passage;

said barrel having its inside and outside surfaces roughened for inducing turbulent layers between the jets of lox and gas emerging from said first and second annular passages; and gas metering means formed in said second boundary wall for metering and delivering a flow of hot gases through said second boundary wall means into said second annular passage.

2. The apparatus of claim 1 wherein said lox post includes a barrel extended on one end of said lox post remote from said unrestricted lox inlet opening wherein said lox plug is received in said barrel, and means for interchangeably mounting said lox plug to said lox post in said barrel.

3. The apparatus of claim 2 wherein said lox plug includes engagement means by which said plug may be grasped for removing said lox plug from said barrel of said lox post.

4. The apparatus of claim 1 wherein said lox plug includes a coolant hole at an end of said lox plug which is axially opposite from the end of said lox post having said unrestricted lox inlet opening.

5. The apparatus of claim 1 wherein said lox metering means includes a lox sieve formed in a cylindrical sidewall of said lox plug, said sieve including a plurality of metering orifices which are dimensioned to provide a desired mixture ratio.

6. The apparatus of claim 1 wherein said first annular passage is recessed axially from said second anular passage to define an isolated mixing space removing the intersection of mixture of the lox and gas coming from said first and second annular passages from the combustion chamber so that said mixture is less sensitive to pressures occurring in the combustion chamber to provide for more uniform mixture.

7. The apparatus of claim 1 wherein said second boundary wall includes a cylindrical sleeve attached to said lox post, and said hot gas metering means includes a hot gas sieve formed in a sidewall of said cylindrical sleeve which includes a plurality of metering orifices through which hot gases pass.

8. The apparatus of claim 7 wherein said openings in said hot gas metering sieve are slanted toward the combustion chamber end of said cylindrical sleeve.

9. The apparatus of claim 7 wherein said lox post has an outside diameter which is greater than or equal to 1:25 inches affording increased resistance against bending moments and stresses.

10. A propellant injection element for the main combustion chamber of a rocket engine of the type which includes a main injector assembly having a primary face plate which faces the combustion chamber, and a secondary face plate spaced from said primary face plate away from said combustion chamber, said injection element comprising:

an elongated lox post having a lox inlet formed at one end;

an interchangeable lox plug carried by said lox post;

means accessible from the primary face plate side of said main injector assembly for interchangeably mounting said lox plug to said lox post in a manner that said lox plug may be removed and exchanged from said lox post while said injection element is affixed in said main injector assembly between said primmary and secondary face plates;

a central lox passage formed through said elongated lox post and lox plug;

an annular lox passage surrounding an outside wall of said lox plug;

lox metering means formed between said central lox passage and said annular lox passage for delivering and metering a flow of lox therebetween which flows outwardly through said annular passage toward said combustion chamber;

an annular gas passage coaxial with said lox passage;

a removable sleeve surrounding said second annular passage and providing an outer boundary wall for said second annular passage; and gas metering means formed in said removable sleeve through which a hot gas is delivered and metered into said annular gas passage for delivery to said combustion chamber coaxial with the delivery of said lox in said lox annular passage.

11. The apparatus of claim 10 wherein said annular lox passage is recessed away from said combustion chamber with respect to said annular gas passage so that the intersection of said mixture of said lox and gas is removed from said combustion chamber so that the mixture is less sensitive to pressures occurring in said combustion chamber.

12. The apparatus of claim 10 wherein said lox post includes a cylindrical barrel extended at an end of said lox post remote from said lox inlet, said cylindrical barrel providing a boundary wall separating said lox annular passage and said gas annular passage.

13. The apparatus of claim 12 wherein said cylindrical barrel includes a turbulence-inducing roughened surface on the inside diameter and the outside diameter surfaces of said barrel which induce turbulence into the merging jets of lox and gas emerging from said lox annular passage and said gas annular passage.

14. The apparatus of claim 12 wherein said lox plug is received in said cylindrical barrel of said lox post, and said lox plug includes a plurality of radially extending fins which engage the inside diameter of said cylindrical barrel and provide means for turning said plug to remove said plug from said lox post.

15. The apparatus of claim 10 wherein said removable sleeve includes a plurality of inwardly extending radial fins which engage said lox post barrel and provide engagement means for turning said sleeve to remove it from said lox post for exchanging said sleeve to alter the gas metering means and provide a different mixture ratio.

16. The apparatus of claim 10 including lock ring means fixed to said primary face plate for retaining said removable sleeve.

17. A low pressure loss injector element for use in a rocket engine and the like comprising:

an elongated lox post having an unrestricted lox inlet;

an interchangeable lox plug removably carried by said lox post at a remote end of said lox inlet and including engagement means for removing said plug;

a central lox passage extending coaxially and centrally through said lox post and lox plug;

an annular lox passage coaxial with said central lox passage;

an annular gas passage coaxial with said annular lox passage;

lox metering means formed between said central lox passage and said annular lox passage for metering and delivering a flow of lox from said central lox passage to said annular lox passage said lox metering means including a lox metering sieve formed in a cylindrical sidewall of said lox post and having a plurality of metering orifices formed therein;

gas metering means for metering a flow of gas through said annular gas passage coaxial with said flow of lox through said annular lox passage; and said lox plug being removable and replaceable so that the lox metering means may be changed to provide a different mixture ratio.

18. The apparatus of claim 17 wherein said annular lox passage is recessed with respect to said annular gas passage away from said combustion chamber so that the intersection of mixture of said lox and gas jets emerging from said annular passages is recessed from said combustion chamber.

19. The apparatus of claim 17 including a cylindrical barrel carried on an end of said lox post remote from said lox inlet, said lox plug being received in said cylindrical barrel, and said cylindrical barrel providing a boundary wall between said lox annular passage and said gas annular passage.

20. The apparatus of claim 19 wherein said cylindrical barrel includes a roughened turbulence-inducing surface formed on an inside diameter and an outside diameter of said barrel for inducing turbulence in the emerging jets of lox and gas emerging from the lox annular passage and gas annular passage.

21. The apparatus of claim 17 wherein said lox post has an outside diameter greater than or equal to 1.25 inches for resisting lateral flow forces occurring in said injector assembly.

22. The apparatus of claim 17 including a hot gas sleeve surrounding said annular gas passage having gas metering means formed in a cylindrical sidewall of said shroud which deliver and meter a flow of gases into said annular gas passage.

23. The apparatus of claim 22 including removable attachment means for removably attaching said hot gas shroud to said lox post.

* * * * *